(12) United States Patent
Brown

(10) Patent No.: US 7,794,592 B2
(45) Date of Patent: Sep. 14, 2010

(54) WASTEWATER DISINFECTION APPARATUS AND METHODS

(76) Inventor: Ralph Brown, 3550 Gila Bend, Casper, WY (US) 82604-5400

( * ) Notice: Subject to any disclaimer, the term of this patent is extended or adjusted under 35 U.S.C. 154(b) by 0 days.

(21) Appl. No.: 11/480,247

(22) Filed: Jun. 29, 2006

(65) Prior Publication Data
US 2008/0000844 A1    Jan. 3, 2008

(51) Int. Cl.
*B01F 3/04* (2006.01)
*C02F 1/78* (2006.01)

(52) U.S. Cl. .................. 210/192; 210/202; 210/220; 210/258

(58) Field of Classification Search .............. 210/749, 210/758, 760, 170.08, 170.06, 258, 198.1, 210/220, 519, 620, 629, 202; 261/100, 119.1, 261/121.1, 122.1, DIG. 70; 239/145
See application file for complete search history.

(56) References Cited

U.S. PATENT DOCUMENTS

| | | | | |
|---|---|---|---|---|
| 3,607,735 | A | * | 9/1971 | Hover et al. ................. 210/627 |
| 3,850,801 | A | | 11/1974 | Pearson |
| 3,857,910 | A | * | 12/1974 | Day ........................... 210/199 |
| 3,864,247 | A | | 2/1975 | Fuchs |
| 3,873,445 | A | | 3/1975 | Bussard |
| 3,935,077 | A | | 1/1976 | Dennison |
| 4,076,617 | A | * | 2/1978 | Bybel et al. ................. 210/748 |
| 4,201,663 | A | | 5/1980 | Rollag et al. |
| 4,256,574 | A | * | 3/1981 | Bhargava .................... 210/760 |
| 4,846,965 | A | | 7/1989 | Clifft et al. |
| 4,867,871 | A | | 9/1989 | Bowne |
| 4,909,948 | A | | 3/1990 | Eichelberger, Sr. |
| 4,925,571 | A | | 5/1990 | Jacob et al. |
| 4,978,445 | A | | 12/1990 | Long |
| 5,024,952 | A | | 6/1991 | Alsop |
| 5,133,862 | A | * | 7/1992 | Cannan et al. ......... 210/321.75 |
| 5,217,609 | A | | 6/1993 | Holdeman |
| 5,221,470 | A | | 6/1993 | McKinney |
| 5,266,216 | A | * | 11/1993 | Agueda et al. ............... 210/760 |
| 5,266,239 | A | | 11/1993 | Drewery |
| 5,582,680 | A | | 12/1996 | Vankouwenberg et al. |
| 5,647,977 | A | | 7/1997 | Arnaud |
| 5,698,095 | A | | 12/1997 | Kami |
| 5,770,081 | A | | 6/1998 | McKinney |
| 5,785,854 | A | | 7/1998 | McKinney |
| 5,885,459 | A | | 3/1999 | Lerche et al. |

(Continued)

FOREIGN PATENT DOCUMENTS

EP    0112424 A1    7/1984

(Continued)

OTHER PUBLICATIONS

Advanced Class I Wastewater Treatment Plants 2 page Brochure; Bio-Action, 2003.

(Continued)

*Primary Examiner*—Matthew O Savage
*Assistant Examiner*—Lucas Stelling
(74) *Attorney, Agent, or Firm*—Santangelo Law Offices, P.C.

(57) ABSTRACT

The inventive technology relates, in various embodiments, to novel wastewater heat systems, novel wastewater dosing systems, novel gas bubbling systems, novel flow control systems, novel disinfection systems, novel wastewater conveyance systems, and novel portable wastewater treatment systems, each of which may enhance the wastewater treatment process and its applicability.

15 Claims, 8 Drawing Sheets

U.S. PATENT DOCUMENTS

| | | | |
|---|---|---|---|
| 5,972,216 A | 10/1999 | Acernese et al. | |
| D423,638 S | 4/2000 | Drewery | |
| D424,659 S | 5/2000 | Drewery | |
| D426,866 S | 6/2000 | Drewery | |
| 6,096,203 A | 8/2000 | Drewery | |
| 6,106,704 A | 8/2000 | Drewery | |
| 6,180,004 B1 | 1/2001 | Drewery | |
| 6,224,752 B1 | 5/2001 | Drewery | |
| 6,296,766 B1 | 10/2001 | Breckenridge | |
| 6,358,411 B1 * | 3/2002 | McKinney | 210/220 |
| 6,528,024 B2 * | 3/2003 | Izumi et al. | 422/186.11 |
| 6,773,609 B1 * | 8/2004 | Hashizume | 210/748 |
| 6,846,407 B2 | 1/2005 | Anderson et al. | |
| 6,887,344 B1 | 5/2005 | VanKouwenberg | |
| 6,896,804 B2 | 5/2005 | Haerther et al. | |
| 2002/0117445 A1 | 8/2002 | Whiteman | |
| 2002/0179514 A1 | 12/2002 | Anderson et al. | |
| 2003/0209489 A1 | 11/2003 | Haerther et al. | |
| 2003/0213745 A1 | 11/2003 | Haerther et al. | |
| 2004/0262206 A1 | 12/2004 | Gettman | |
| 2005/0247647 A1 | 11/2005 | Hills | |

FOREIGN PATENT DOCUMENTS

| | | | |
|---|---|---|---|
| EP | 0454614 A1 | 10/1991 | |
| EP | 0507073 A1 | 10/1992 | |
| EP | 0997441 A2 | 5/2000 | |
| EP | 1142835 A2 | 10/2001 | |
| EP | 1236688 A1 | 9/2002 | |
| EP | 1236688 B1 | 10/2004 | |
| JP | 10034175 A | 2/1998 | |
| JP | 10118688 A | 5/1998 | |
| JP | 10159151 A | 6/1998 | |
| JP | 10266299 A | 10/1998 | |
| JP | 10266300 A | 10/1998 | |
| JP | 11050509 A | 2/1999 | |
| JP | 11090465 A | 4/1999 | |
| JP | 2000126751 A | 5/2000 | |
| JP | 2000263098 A | 9/2000 | |
| JP | 2000308899 A | 11/2000 | |
| JP | 2000334451 A | 12/2000 | |
| JP | 2002038580 A | 2/2002 | |
| JP | 2002239570 A | 8/2002 | |
| WO | WO 82/00135 | 1/1982 | |
| WO | WO 83/02770 | 8/1983 | |
| WO | WO 92/12938 | 8/1992 | |
| WO | WO 93/24415 | 12/1993 | |
| WO | WO 95/27682 | 10/1995 | |
| WO | WO 96/34841 | 11/1996 | |
| WO | WO 96/35880 | 11/1996 | |
| WO | WO 99/01385 | 1/1999 | |
| WO | WO 01/44119 A1 | 6/2001 | |
| WO | WO 03/037806 A1 | 5/2003 | |
| WO | WO 2004/069751 A2 | 8/2004 | |
| WO | WO 2004/101447 A1 | 11/2004 | |
| WO | WO 2005/102943 A2 | 11/2005 | |

OTHER PUBLICATIONS

Hydro-Action Industries, Class I ANSE/NSF Standard 40 Wastewater Treatment Plant, AP Series Operation & Maintenance Manual, On-Site Wastewater Products, 230, 35 pp.

* cited by examiner

WASTEWATER DISINFECTION APPARATUS AND METHODS

Generally, this inventive technology relates to wastewater treatment apparatus and methods. More specifically, the inventive technology relates, in various embodiments, to novel wastewater heat systems, novel wastewater dosing systems, novel gas bubbling systems, novel flow control systems, novel disinfection systems, novel wastewater conveyance systems, and novel portable wastewater treatment systems, among others, that enhance the wastewater treatment process and its applicability.

The desire to treat wastewater, and the desire to improve wastewater treatment processes, has been known in certain industries for many years. In a basic form, the concept involves reducing the biochemical oxygen demand, to varying degrees, of water fouled with a contaminant such as human waste. A primary treatment mechanism active in certain embodiments of the inventive technology described herein is bacteria occurring naturally in human fecal waste, and/or growing therewith. The treated water can then be used for a variety of purposes such as agriculture (crop watering), cleaning, landscaping (e.g., watering grass or plants), water consuming appliances (laundry, dishwasher, shower, etc), livestock consumption, and human consumption, typically depending on the degree of treatment. Of course, proper treatment of wastewater has significant social benefits, including but not limited to public health, odor mitigation, water conservation, and overall social well-being.

However, even with all the effort that has been invested in wastewater treatment technologies, there still is significant room for improvement. Inefficient technologies may require substantial amounts of time to achieve a given treatment, and might not offer system operators the ability to control the process as desired. Further, conventional wastewater treatment methodologies do not benefit from the novel and non-obvious incorporation therein of known technologies from disparate fields.

It is of note that any of the inventive technologies may be implemented in a portable (e.g., mobile) system. Such a system can be moved from site to site as necessary, perhaps serving wastewater treatment needs of oil field camps, disaster victims, festivals, sporting events, etc. Such portable systems could simply be hooked up to a vehicle and transported as necessary. They are, of course, in stark contrast to permanently stationed (e.g., underground) systems.

Certain aspects of the inventive technology relate to novel methods and related apparatus intended to entrain ozone into wastewater. Conventional methods of incorporating ozone into water involve substantial pressurization of the ozone (e.g., to 50 PSI) so that it may be injected into water (e.g., via a venturi) that is pressurized only slightly less (e.g., to 40 PSI). A static mixer may then be used to entrain (through bubbling of the ozone and subsequent mixing) the ozone into the water. The novel ozone related technology disclosed herein may eliminate the need for such high pressurization and for the static mixer.

SUMMARY OF INVENTION

The present inventive technology includes a variety of independent aspects that may be selected in different combinations based upon the particular application or needs to be addressed. In their basic forms, the inventive technology relates generally to the following independent inventive aspects, to name a few: heating of wastewater—whether directly or indirectly—to enhance bacterial processing thereof (e.g., by increasing bacterial population); controlled wastewater delivery to a wastewater treatment tank; ozone entrainment with an permeable diffuser; air entrainment diaphragm configuration; parallel configuration of wastewater lift stations; and a portable wastewater treatment system.

Objects of certain aspects of the inventive technology generally are to provide more operator control over wastewater treatment, whether by providing a portable system or enabling greater control over the process itself. Wastewater heating, for example, whether indirectly through heating of air that is entrained in wastewater at some time, or directly upon heating of the water itself, may effect a more efficient treatment process and provide greater control over the treatment process itself (e.g., by enabling an acceleration of the treatment process upon the application of heat). Such heating may also render the system "cold weather durable" by enabling use of the system in temperatures that would cause operational problems in conventional systems.

Controlled wastewater delivery to a treatment tank may also provide a more efficient process, as such may create a more stable, healthier bacteria population that is better able to process waste. Ozone entrainment (e.g., into wastewater held in a disinfection tank), may provide benefits such as the elimination of the need to highly pressurize ozone (e.g., above 10 PSI) and the elimination of the need for apparatus such as a static mixer and associated with conventional ozone entrainment technologies. The air entrainment diaphragm configuration disclosed herein achieves a wastewater circulation pattern that enhances waste processing. The inventive technology relative to parallel configuration of wastewater lift stations has benefits relative to preclusion of total system blockage in the event of the stoppage of merely one lift station. The portable wastewater treatment system technology has benefits relative to convenience, cost savings, ability to meet customer need, expedited provision of wastewater treatment services and installation of a wastewater treatment facility, and ease of system maintenance due to its above-ground establishment.

Particular embodiments may achieve the removal of 98% of biochemical oxygen demand, 98.5% of total suspended solids, and 99% of nitrogen ammonia. At the least, water cleansed by the system can be used for fire suppression, or surface sprinkling (e.g., drip and spray irrigation) of vegetation, as but two examples. Where it is used for irrigation of vegetation, the level nitrates that may be left in the water by some embodiments of the inventive technology may require that the water be applied above the vegetation's root structure and that the water not run off into natural bodies of water. Naturally, further objects of the invention are disclosed throughout other areas of the specification and claims.

DETAILED DESCRIPTION OF PREFERRED EMBODIMENTS

Figure 1:
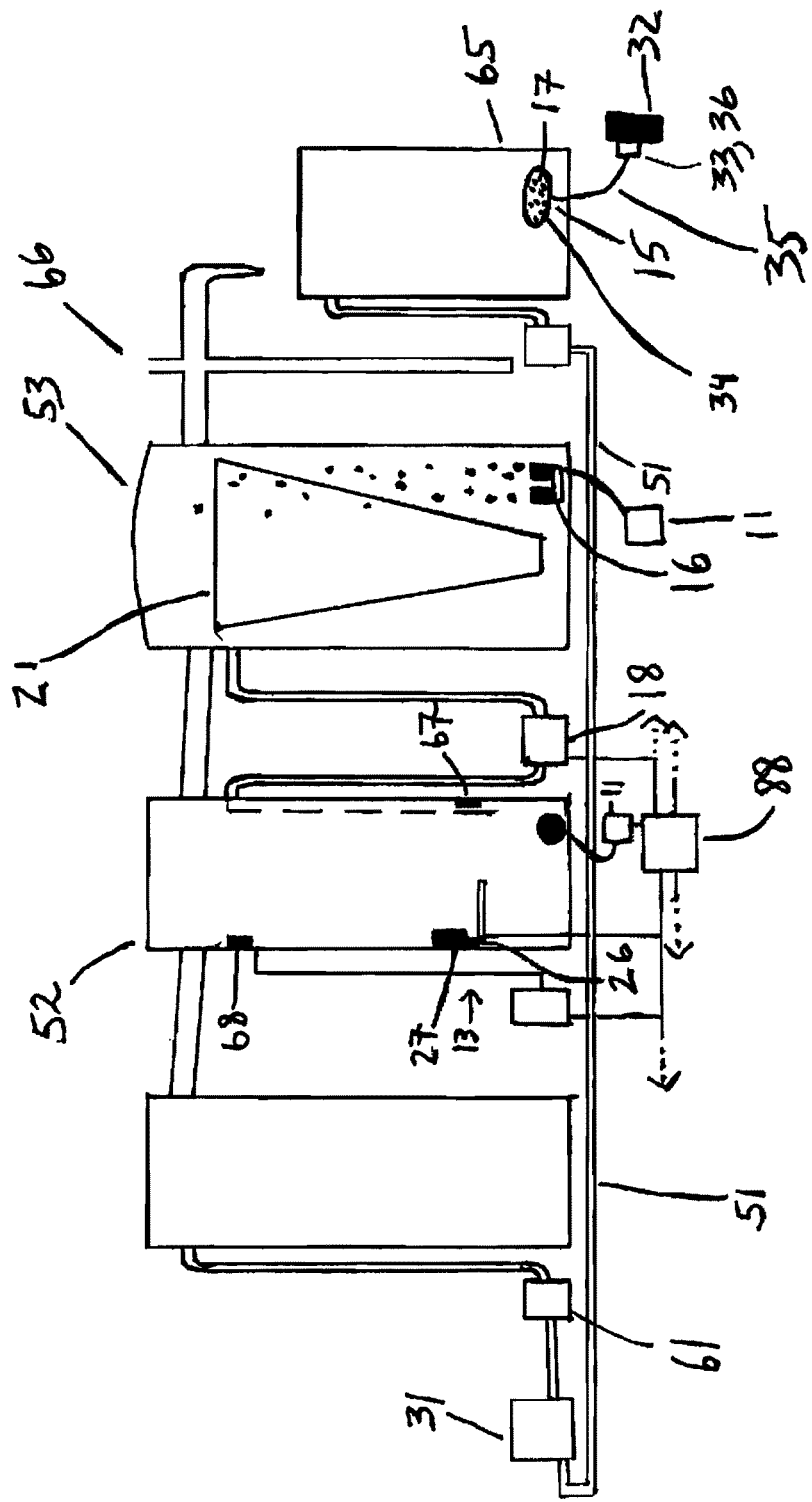
FIG. 1 shows a schematic of at least one embodiment of the inventive wastewater treatment system technology (portable or stationary).
Figure 2:
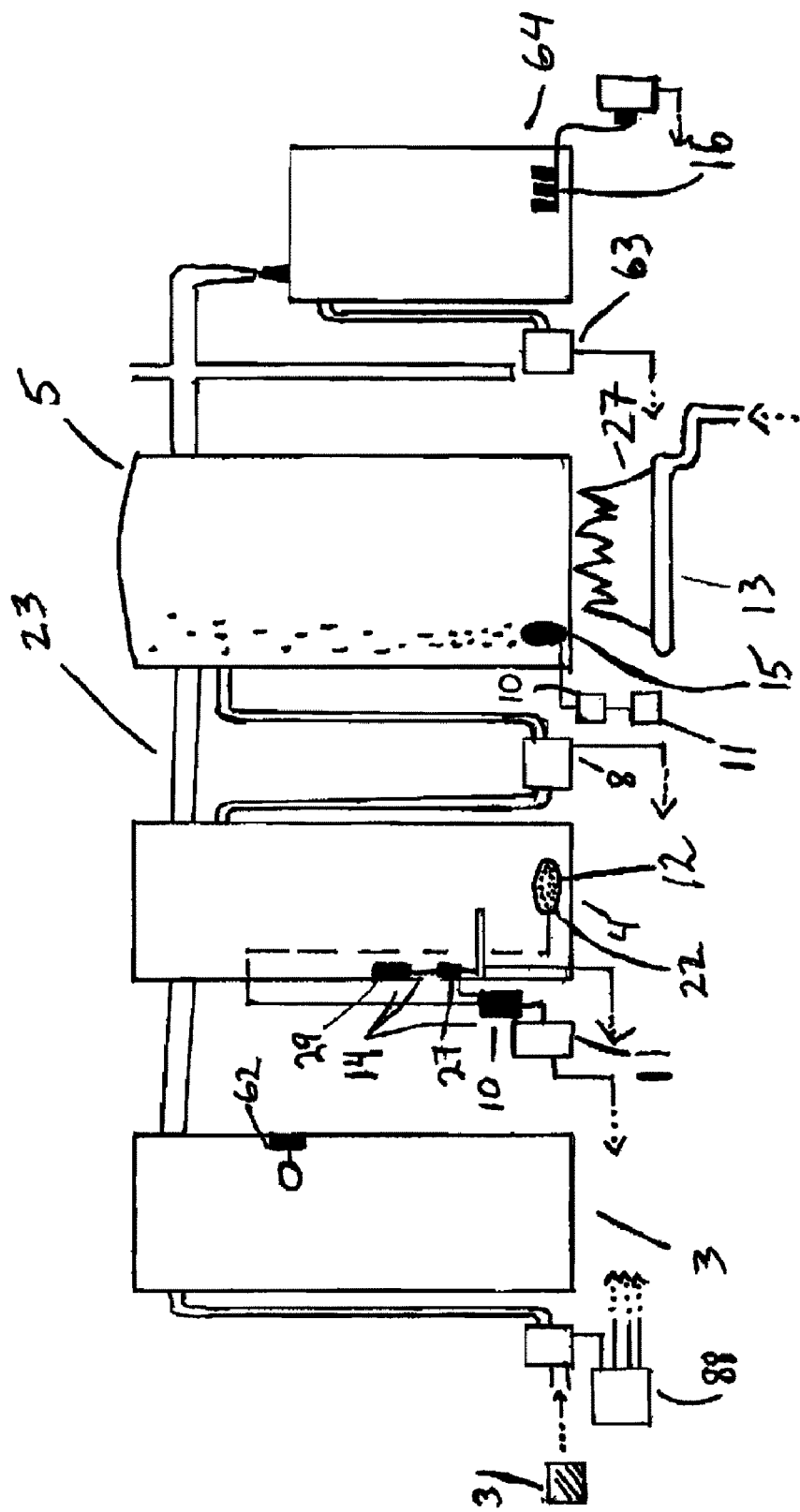
FIG. 2 shows a schematic of at least one embodiment of the inventive wastewater treatment system technology (portable or non-portable).
Figure 3:
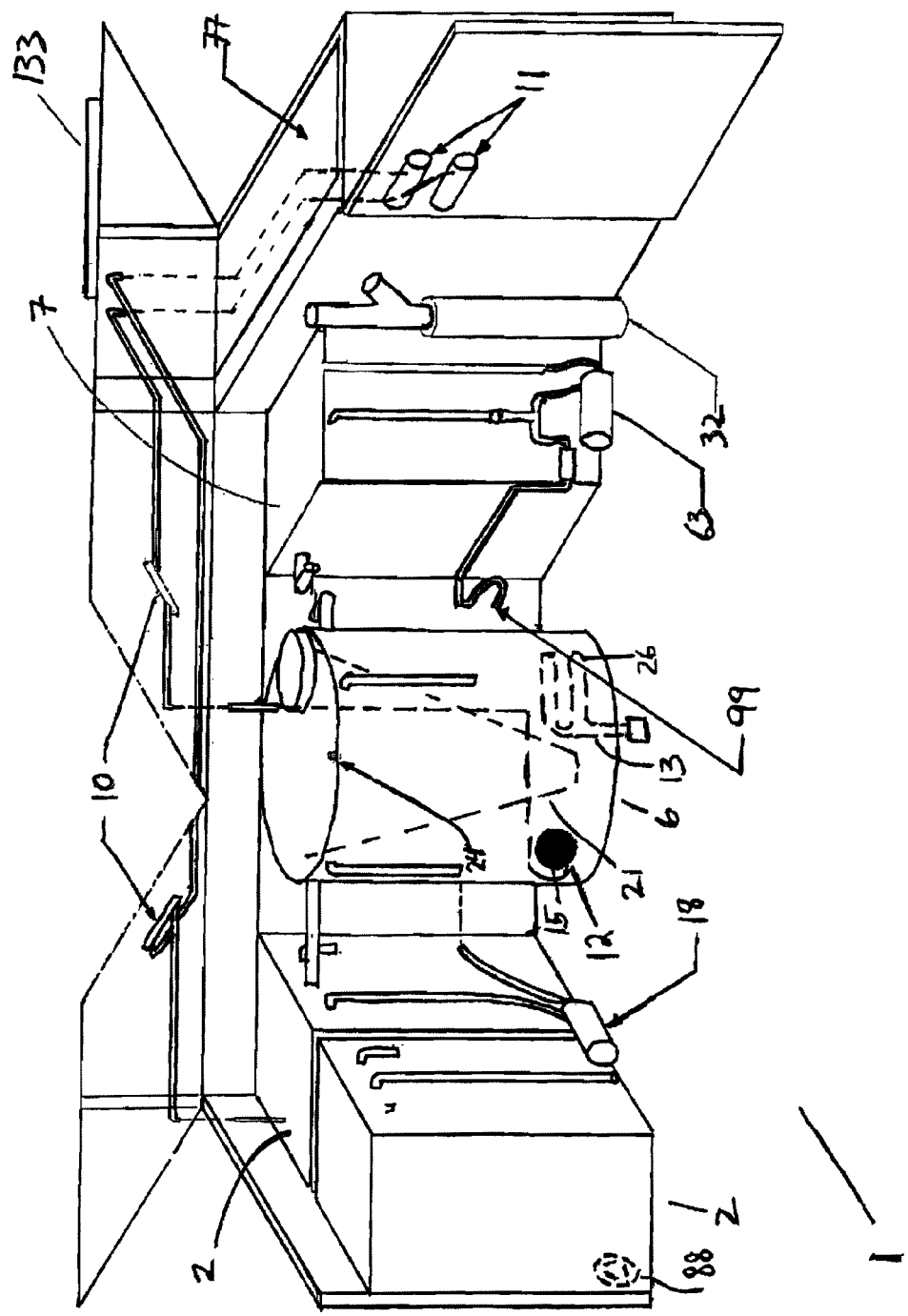
FIG. 3 shows a schematic of at least one embodiment of the inventive wastewater treatment system technology (portable or non-portable).
Figure 4:
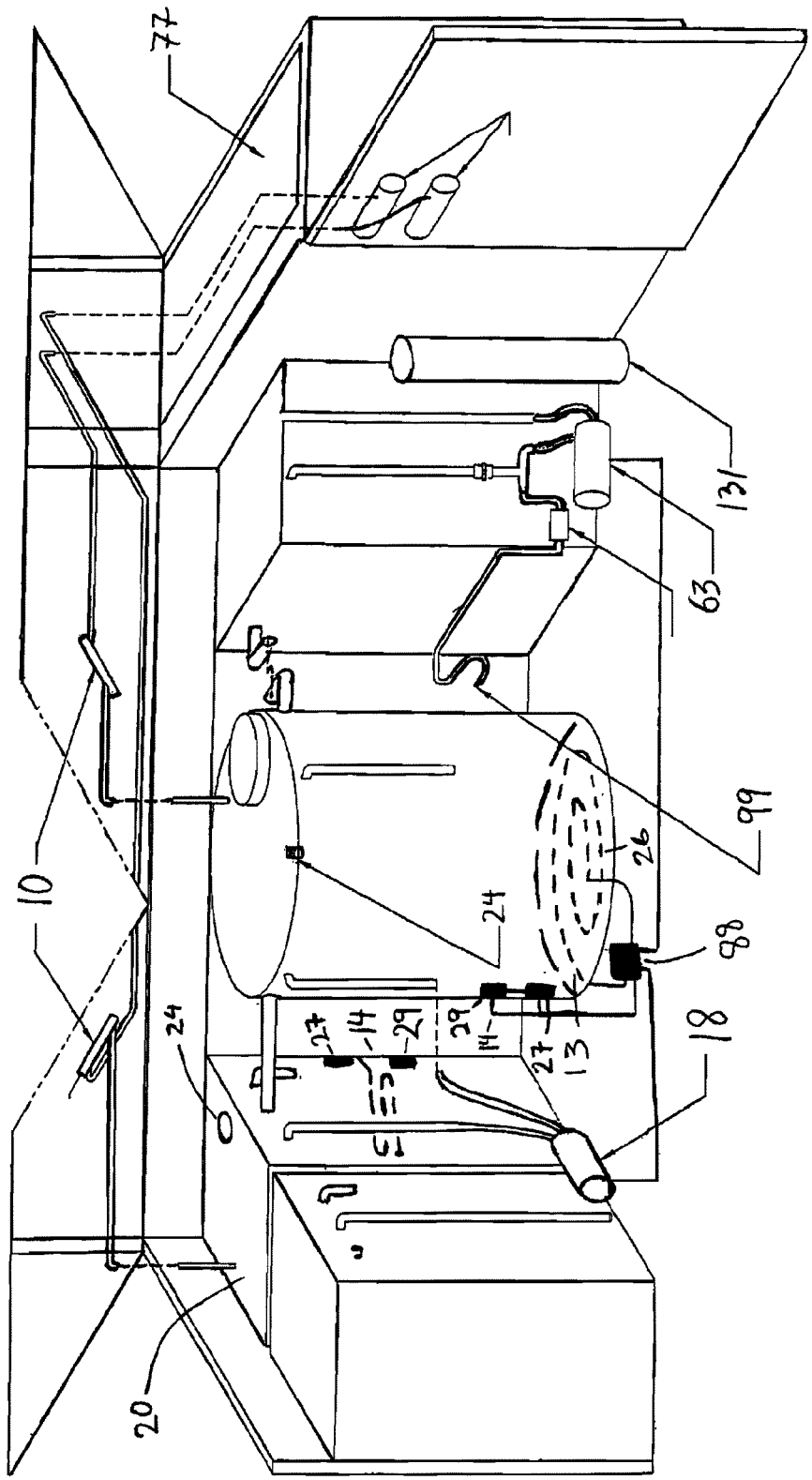
FIG. 4 shows a schematic of at least one embodiment of the inventive wastewater treatment system technology (portable or non-portable).

As mentioned earlier, the present invention includes a variety of aspects, which may be combined in different ways. The following descriptions are provided to list elements and describe some of the embodiments of the present invention. These elements are listed with initial embodiments, however it should be understood that they may be combined in any manner and in any number to create additional embodiments. The variously described examples and preferred embodiments should not be construed to limit the present invention to only the explicitly described systems, techniques, and applications. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

At least one embodiment of the inventive technology may relate to a wastewater treatment system 1 that includes at least one pretreatment tank 2 (e.g., a settling tank 3, and perhaps another pretreatment tank 4), a main aeration treatment tank 5 (that may also be a clarifying tank 6), and a water disinfection tank 7, all perhaps serially connected. The main aeration treatment tank 5 may be a HydroAction Model AP-500, AP-600, AP-750, AP1000G, AP-1500G, depending on demand, or indeed may be some other type of suitable unit. Such models may be shown and described in a Hydro-Action Industries literature (see, e.g., "Peace of Mind Guaranteed!, Wastewater Treatment Plants for Residential & Commercial Applications." HydroAction Industries brochure, 2003; and "HydroAction Industries Class I ANSI/NSF Standard 40 Wastewater Treatment Plant AP Series; Operation & Maintenance Manual; On-Site Wastewater Products", 2003, both hereby incorporated herein by reference.

It is noted that any tank incorporated into the system, whether pretreatment or otherwise, is considered a type of wastewater treatment tank. Gravity or even water pressure may be used to assist flow from one tank to the next, but where needed or desired, pumps 8 may be used instead or in addition. The system may, but need not, include one or more wastewater generator 31 at the furthest upstream end, whose generated wastewater may be treated by the treatment apparatus downstream. A wastewater generator may be anything that dirties water, such as a water consuming appliance 9 (e.g., a toilet, laundry, shower, etc. in a water use room 77 such as a restroom). The entire system may be portable such that it can be moved as necessary. The system may involve gas heaters 10 that heat gas such as air (whether electrically, via flame, via a solar heating system, or otherwise) and perhaps gas pumps 11 (e.g., air pumps) that eject the heated gas (e.g., heated air) into the wastewater through some sort of bubbler 12. Bubblers may also be used to entrain unheated gas into wastewater. The system may include a wastewater heat system 13 (including, e.g., electrical water heaters that heat wastewater, gas water heaters that heat wastewater, solar heating system that heat wastewater, and/or gas heaters (electrical, flamed, or solar heating system based) that heat gas, and associated componentry), whether established to directly or indirectly heat water contained in a tank or as it travels through a conveyance structure (e.g., piping). Any solar heating system may involve solar panels 133. Any heat transferred to the wastewater may be done so with the assistance of a differential wastewater heat system 14, which may form part of the wastewater heat system. Such a system may adjust the amount of heat added to the wastewater according to the concentration of waste in the wastewater as indicated by a waste concentration indicator. Of course, the heat may be added directly (e.g., with an electric heat element submerged in the wastewater, or via flame) or indirectly (e.g., by heating air that is later entrained in the wastewater).

The system's disinfection system may utilize chlorine or ozone to finalize the treatment process; in ozone-based systems, the ozone may be entrained into the water through a diffuser such as a diaphragm 15 or a stone(s) 16. Certain embodiments may focus on an ozone-based disinfection system, in which ozone is entrained into wastewater through a diaphragm having, e.g., a perforated membrane 17. The overall system may also include a dosing pump 18 that, in certain embodiments, provides controlled flow of wastewater from a pretreatment tank to a main treatment tank.

In those embodiments involving one or more pretreatment tanks, there may be a settling tank 3, typically the first of the system's tanks into which wastewater is flowed. Of course, the settling tank may require that the wastewater reside therein for a certain time in order that certain materials settle to the bottom—or float to the top—of the tank. One of the pretreatment tanks (e.g., the pretreatment tank immediately downflow of the settling tank) may be termed a pretreatment control tank 20, particularly in cases where the wastewater has a biochemical oxygen demand (BOD) that is greater than 250 (e.g., a typical BOD of wastewater generated by an oil field man camp can be as high as 1300 because of little or no dilution of high BOD toilet water by shower, laundry or other low BOD wastewater). Such a pretreatment tank may simply reduce the BOD to a level that can be handled by the next tank (a main aeration treatment tank, perhaps, that may include a clarifying structure 21). The 250 BOD limitation, effectively requiring the pre-treat control tank for those applications expecting greater than 250 BOD wastewater input, is a constraint imposed by an "off the shelf product" such as the HydroAction Model AP-500 as the main aeration treatment tank in certain embodiments employing such a tank. It is noted that water is a broad term as used herein, and includes wastewater—the two terms are not mutually exclusive.

The pretreatment control tank and/or the main aeration treatment tank (again, which may be a water clarifying tank) may involve oxygenated gas entrainment elements 22 (e.g., a diffuser) to entrain oxygenated gas such as air from the surrounding environment into wastewater contained therein. Such gas may be heated to enhance the processing of waste by the bacteria in the wastewater. Any tanks may incorporate overflow structures 23 (e.g., overflow piping) in order to better handle extraordinarily high flows. There may, in certain embodiments, be provided surge protection (250 gallon surge protection, as but one example). Any tanks in the system may include one or more ports 24 that facilitate water quality testing. Tank capacity appropriate for several applications may be 500 gallons, but certainly other sizes may be employed (including but not limited to: 600, 750, 1,000 and 1,500 gallon systems). Typically, but not always, all of the tanks in a given system will have substantially the same capacity.

Certain aspects of the inventive technology may relate to heating of wastewater, whether directly or indirectly, to enhance bacterial processing of waste in the water. Direct heating of wastewater, as one might expect, includes application of heat from the source to the wastewater or a container thereof. Direct heating includes heating similar to the manner in which one might heat water in a pot on the stove, whether with an electrical heat element (e.g., electric coils), or a flame heat element (e.g., natural gas burner), as but two examples; it also but also includes perhaps configuring an immersible electric heat element in the wastewater itself. Indirect heating refers to direct heating of some material other than the water or its container, where such material (e.g., a gas) then interfaces with the wastewater to transfer heat thereto. Indirect heating includes, but is not limited to, the heating of gas (e.g., oxygenated gas such as air) that is then entrained in the wastewater (perhaps with a gas entrainment element such as a bubbler), and perhaps even the heating of a liquid other than the wastewater (e.g., clean water) that is then mixed with the wastewater to transfer heat thereto.

Certain embodiments of the inventive technology may relate to a water treatment apparatus that includes a wastewater treatment tank and a wastewater heat system 13 configured (e.g., selected, designed and/or set up) to heat wastewater that is contained in a wastewater treatment tank at some time. Of course, as mentioned, the wastewater heat system can either directly heat the wastewater or indirectly heat the wastewater—both are inventive aspects. A preferred method of indirect heating includes heating of air (e.g., with an electric, or flamed, air heater) before it is entrained in wastewater. Typically, that gas entrainment procedure occurs while the wastewater is contained in a wastewater tank, although certainly gas could be entrained while the water is conveyed to a tank.

Examples of direct heating include but are not limited to use of thermal energy dissipated due to electrical resistance in an electrical heat element 26 to heat water in contact therewith, and/or to heat a wastewater treatment tank or conduit (and thus its contents); and/or the use of combustible gas flame 27 to heat a wastewater container (e.g., a tank), or pipe conveying wastewater to a tank. Either is a type of water heater. In at least one embodiment, heat is applied to wastewater while it is in a pretreatment tank. Such heat may enhance bacterial processing of waste not only while it is in such pretreatment tank, but also in downstream tanks (e.g., a wastewater clarifier tank, which may be the same as, or different from, an aerobic treatment unit, and which may be serially coupled to a pretreatment tank). Indeed, heat may be applied to the wastewater, whether directly or indirectly, at any point in the treatment process, and even at more than one point in the process at the same time. For example, in at least one embodiment, heated air is entrained in wastewater as it is contained in two tanks.

It should also be understood that there may be any of a myriad of heat application schemes (direct heating at a pretreatment tank in conjunction with indirect heating at additional points in the system; indirect heating at two points in the system in conjunction with direct heating an additional point; indirect heating only; direct heating only, as but a few examples). It is of note that particularly effective results have been observed where wastewater in a second of two treatment tanks is directly heated while wastewater is indirectly heated (via entrainment of heated air) not only while it is in the aforementioned second treatment tank, but also while it is in a downstream wastewater clarifier tank (any treatment tank with a water clarifying structure therein). Of course, to varying extents, the need for downstream heating of wastewater to achieve a desired waste processing enhancement effect can be reduced—or perhaps eliminated—through use of upstream heaters that heat wastewater (whether directly or indirectly) before it enters a tank of interest, as the heat applied from such upstream heaters may indeed by carried downstream as wastewater is conveyed through the system. For example, if heat is applied to wastewater in the pre-treatment control tank, heated wastewater will travel from that tank to the immediately downstream tank (e.g., the main aeration treatment tank); as such, some systems might only utilize an upstream heater to heat water in a downstream tank(s). Further, it should also be understood that if heat is applied at the point of entry of wastewater into the tank, then such heating is deemed to occur before the wastewater enters the tank.

As is known in the heating industry, a thermocouple (27) and heater (whether air or water) can be used to heat water (indirectly or directly) to a desired temperature or within a certain range. Indeed, thermocouples find beneficial application in the inventive technology to facilitate control of the treatment process and, perhaps, conserve energy. In at least one embodiment, wastewater may be kept substantially at 120 degrees F., but certainly other heats—and ranges—may be used (e.g., 80 degrees F. to 120 degrees F.). Optimal processing of waste by bacterial cultures has been observed at 120 degrees F., although acceptable results may be achieved at other temperatures, typically, but not necessarily always, at or above 60 degrees F.

In certain embodiments of the inventive technology, the amount of heat applied to the wastewater, whether directly or indirectly, may be adjusted. Such may be provided by a wastewater heat system that includes a differential wastewater heat system 14 (including all necessary componentry such as wires, sensors, etc.). As such, heat can be applied to the wastewater (whether directly or indirectly) to achieve a temperature according to a waste concentration indicator (which indicates waste concentration of the wastewater). Indeed, the higher the waste concentration, the higher one might want the temperature to be, and the more heat should be added to the process to achieve or maintain that temperature. For example, if a measured indicator is low (e.g., a BOD reading is low, such as 100), one might only need to heat the water to 60 degrees F. (if indeed heat is needed to achieve 60 degrees F.); if however, a high reading is recorded (e.g., a BOD reading of 1000), then one might want to heat the water to 120 degrees F. As one might appreciate, the higher the temperature (up to substantially 120 degrees F., as but one example), the quicker the treatment process. As such, the need for enhanced wastewater treatment attributable to increased heating might also depend on the need for expedited wastewater treatment. For example, in cases where the demand is uncertain and the system might be inundated with an very high demand in the near future, fast processing may indeed be desired.

There are various protocols by which the wastewater may be differentially heated. In one, a waste concentration indicator is first sensed (manually or automatically such as once per hour by a waste concentration indicator sensor) after which such reading is used (again, perhaps automatically, with logic circuitry) to determine to which temperature the wastewater should be raised (and perhaps how quickly it should be raised) in order to treat the waste as intended (e.g., within a certain time, or so as to remove a spiked or peaked inflow as quickly as possible). In some embodiments, an automated protocol may require the operator input some sort of information relative to the processing desired (as quickly as possible, within a certain temperature range or below a certain maximum temperature, within a certain time frame, as but a few examples). Manual protocols may involve the use of charts, tables and/or graphs in order to determine the temperature to which waste should be raised and perhaps, how long it should be left at a temperature (e.g., a maximum temperature) in order to treat it as intended. A thermocouple may then be used, again perhaps in conjunction with logic circuitry, in order to raise the wastewater to that temperature.

Waste concentration indicators include but are not limited to the following: biochemical oxygen demand; dissolved oxygen content; turbidity; and chemical oxygen demand; all of the wastewater. In at least one embodiment of the inventive technology, the differential wastewater heat system may include an automatic, waste concentration indicator sensor 29 adapted to sense at least one wastewater concentration indicator. Such automatically sensed value (using known sensing techniques and apparatus) may then be used, perhaps with PLC or other type of computerized control, in conjunction with a thermocouple, to heat the water as appropriate. It is of note that certain indicators may be more quickly sensed, perhaps automatically, than others (e.g., turbidity may be read instantaneously). Automatic sensors 29 may be purchased "off the shelf" (e.g., an automatic DO or automatic turbidity sensor). It is also of note that any of the indicators can be measured manually; the measured value may then be used in some fashion (whether with PLC, other type of computerized control, or with charts, tables, or graphs) to determine to which temperature (and perhaps for how long) wastewater should be raised to process the waste as intended. Such information can be used (again, with some sort of computerized control, perhaps) to effect heating (directly and/or indirectly) of the wastewater. It is of note that, whether measured manually or otherwise, using current technology, COD may take two hours to get a reading, and BOD might take as long as five days. However, sensing technology is continually evolving, and these delays will likely be shortened. Further, any indicators that cannot be currently sensed automatically with an "off the shelf" item will likely soon be "automatically sensible." Further, power source 88 (e.g., on-board such as a battery bank or electric generator, or merely an outlet to an off-board power provider) may be used to power any of the potentially electrically-based functionalities (computing, heating, sensing, pumping, gas-ignition as but a few examples) as needed.

It should be understood that methods are also considered aspects of the inventive technology. As such, at least one embodiment may relate to a water treatment method that comprises the steps of establishing a wastewater treatment tank (e.g., by obtaining and mounting as appropriate); and configuring a wastewater heat system to heat wastewater that is contained in the wastewater treatment tank at some time. As mentioned, the term configuring (or variant forms thereof) includes selecting, designing and/or simply setting up the referenced element in order to achieve an intended effect (in this case, setting up a wastewater heat system to heat wastewater that is contained in the wastewater treatment tank at some time). It is also of note that with the term "at some time", the applicant merely intends to clarify that the heating of the wastewater need not be done while the wastewater is contained in a treatment tank (although it certainly may), but indeed can be done before such containment.

As mentioned, certain types of indirect heating may involve the heating of gas (e.g., an oxygenated gas such as air) that is entrained in wastewater to enhance bacterial processing thereof. In one aspect of the inventive technology relating to indirect heating, a water treatment apparatus may comprise a wastewater treatment tank, a gas entrainment element (e.g., an oxygenated gas entrainment element 22) configured to entrain gas in wastewater that is contained in the wastewater treatment tank; and a gas heater configured to heat the gas. In preferred embodiments, such heating occurs before the gas has become entrained in the wastewater. A related water treatment method may itself comprise the steps of configuring a gas entrainment element in a wastewater treatment tank so as to entrain gas in wastewater contained in the wastewater treatment tank; and configuring a gas heater to heat the gas. Wastewater heating schemes involving heating of gas may be viewed as utilizing the gas as a carrier of heat, and exploiting its intimate contact with the column of water through which it rises, for effective heat transfer to the water. It is noted that to heat air from 80 degrees F. to 120 degrees F., a 9 kW heater may be needed.

At least one aspect of the inventive technology may relate to a controlled system of delivery of wastewater to a wastewater treatment tank. Accordingly, a water treatment apparatus may comprise a wastewater flow pump 18 that pumps wastewater at a controlled delivery rate, where the wastewater is eventually delivered (perhaps through intervening structures such as pipes and perhaps valves) to a wastewater treatment tank (e.g., a gasified wastewater treatment tank that may also be a wastewater clarifier tank) for treatment therein. Such controlled delivery rate may be inflow independent, such that during an inflow spike, there is not an unavoidable automatic response in the flow to the treatment tank (although indeed the pump can be programmed to have an automatic response such as an increase in its controlled delivery rate so as to avoid, e.g., overflowing of a pretreatment tank).

One purpose of configuring a wastewater pump so as to control the flow of wastewater to an aeration tank is to "feed" the bacteria that process waste at a rate that is not entirely irregular, instead of a "feast and famine" type pattern characteristic of uncontrolled flow (e.g., unattenuated peaks) associated with a largely unpredictable demand, resulting in a more efficient, and speedier wastewater treatment operation.

The delivery rate from the wastewater pump established immediately upstream of an aerated treatment tank may be continuous (e.g., a continuous 26 gal/hr flow), or discontinuous (e.g., a 260 gal/hr flow for the first 6 minutes of every flow hour, and no flow from the pump for the remaining 54 minutes of that hour). As such, the pump may be timer-controlled (and, indeed, may even be computer controlled).

The wastewater pump established immediately upstream of an aeration tank may be coordinated with the tank from which it may withdraw wastewater so as not to lower the wastewater in that tank below a certain level, as such may cause a previously entirely submerged heat element (e.g., an electrical heat element) to be exposed, at least partially, to air. Such exposure may, as is well known, cause damage to the heat element. There may be a low water level sensor(s) 67 that assures that the dosing (e.g., as controlled by the timer) does not cause an unacceptably low wastewater level. There may also be a high water level sensor 68 that, perhaps in combination with computer control, causes a dosing that is greater than that which would otherwise be observed, so as to avoid tank overflow.

In those embodiments with two or more wastewater treatment tanks, the inventive technology may relate to a water treatment apparatus that comprises a first wastewater treatment tank, a second wastewater treatment tank serially coupled to the first wastewater treatment tank downstream thereof; and a wastewater flow pump configured to pump wastewater from the first wastewater treatment tank to the second wastewater treatment tank and so as to deliver wastewater from the first wastewater treatment tank to the second wastewater treatment tank at a controlled delivery rate. In preferred embodiments, the controlled delivery rate acceptably maintains a wastewater level or range in the first wastewater treatment tank. In order to do this, it may be necessary at times to adjust the controlled delivery rate. Such adjustment may be accomplished via computerized control or manually, perhaps upon consideration (whether by a human operator or a computer) of a water level sensor reading, a waste concentration indicator reading, and/or a desired processing time.

Related technology may address a water treatment method that includes the steps of serially coupling a first wastewater treatment tank to a second wastewater treatment tank upstream of the second wastewater treatment tank, configuring a wastewater flow pump so as to pump wastewater from the first wastewater treatment tank to the second wastewater treatment tank, and pumping wastewater from the first wastewater treatment tank to the second wastewater treatment tank at a controlled delivery rate with the wastewater flow pump.

Another aspect of the inventive technology relates to a wastewater disinfection apparatus that includes a source of ozone 32, an ozone pressurization system 33 configured to pressurize the ozone, and an ozone permeable diaphragm 34 established in a wastewater treatment tank and configured to entrain the ozone in wastewater in the wastewater treatment tank. The wastewater treatment tank in which the diffuser is established may be referred to as a disinfection treatment tank, and may appear downstream of any aeration or clarifying tanks. The ozone source may be an ozone generator such as a corona discharge ozone generator or an ultraviolet light ozone generator. In other embodiments the source of ozone may be a pressurized tank of ozone. Of course, there may be an ozone conveyance system 35 established between the ozone pressurization system and the ozone permeable diffuser. It should be noted that the ozone pressurization system may need only pressurize ozone sufficiently so that it may pass through the perforated membrane that a diaphragm may have, thereby creating ozone bubbles. This might require only a few pounds of pressure (e.g., 3 PSI); typically less than 6 PSI are required. In those embodiments where the source of ozone is merely a pressurized tank of ozone, the pressurized tank (and any regulator that may exist) is the ozone pressurization system. Indeed, in certain embodiments, ozone pressurization may be only a lateral side effect (albeit a desirous one) of, e.g., ozone generation or ozone containment; in such systems, an ozone pressurization system is still deemed to exist. In other embodiments (e.g., those with an ozone generator), the pressurization system may be a pump 36. Related wastewater disinfection methods may include the steps of establishing (e.g., obtaining and setting up) a source of ozone, pressurizing the ozone with an ozone pressurization system, and entraining the ozone in wastewater contained in a wastewater treatment tank with an ozone permeable diaphragm.

Figure 7:
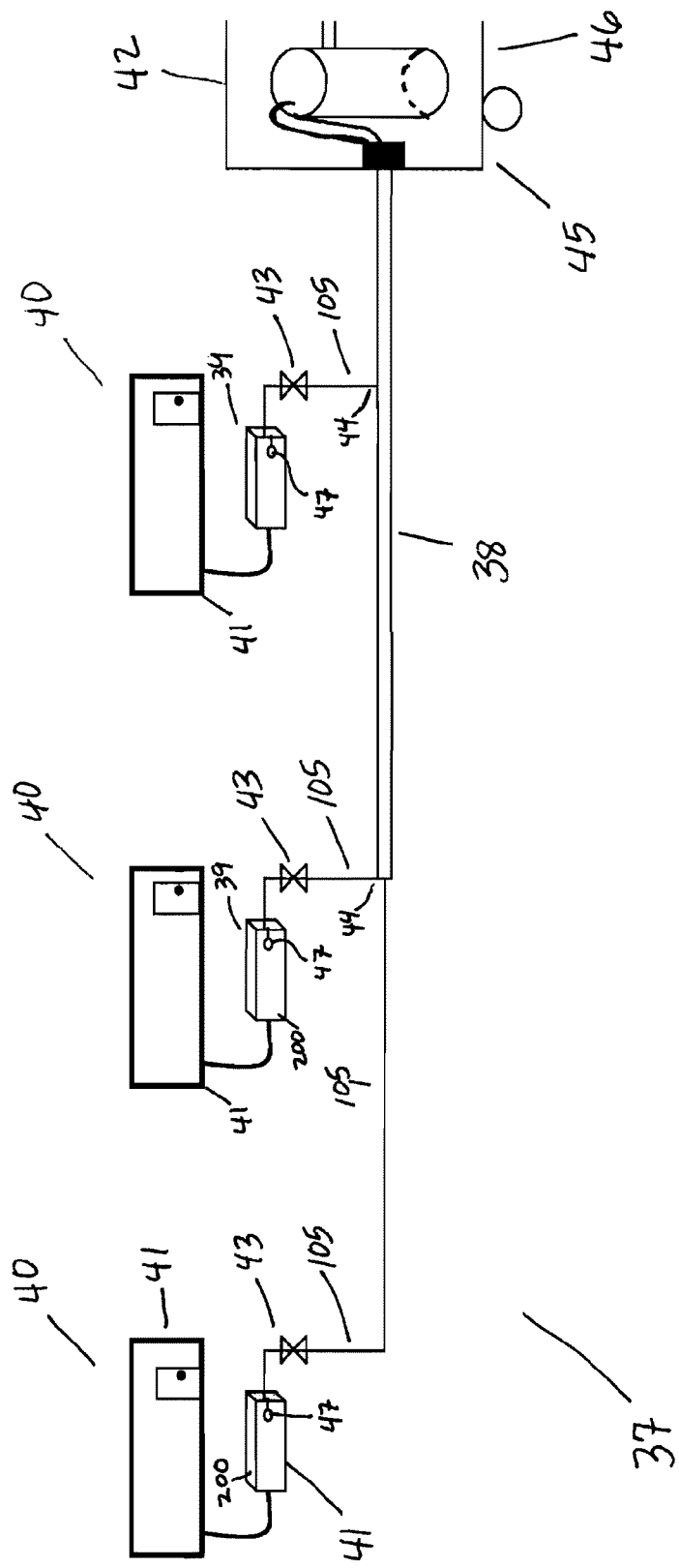
FIG. 7 shows a schematic of at least one embodiment of the inventive wastewater conveyance technology.
Figure 8:
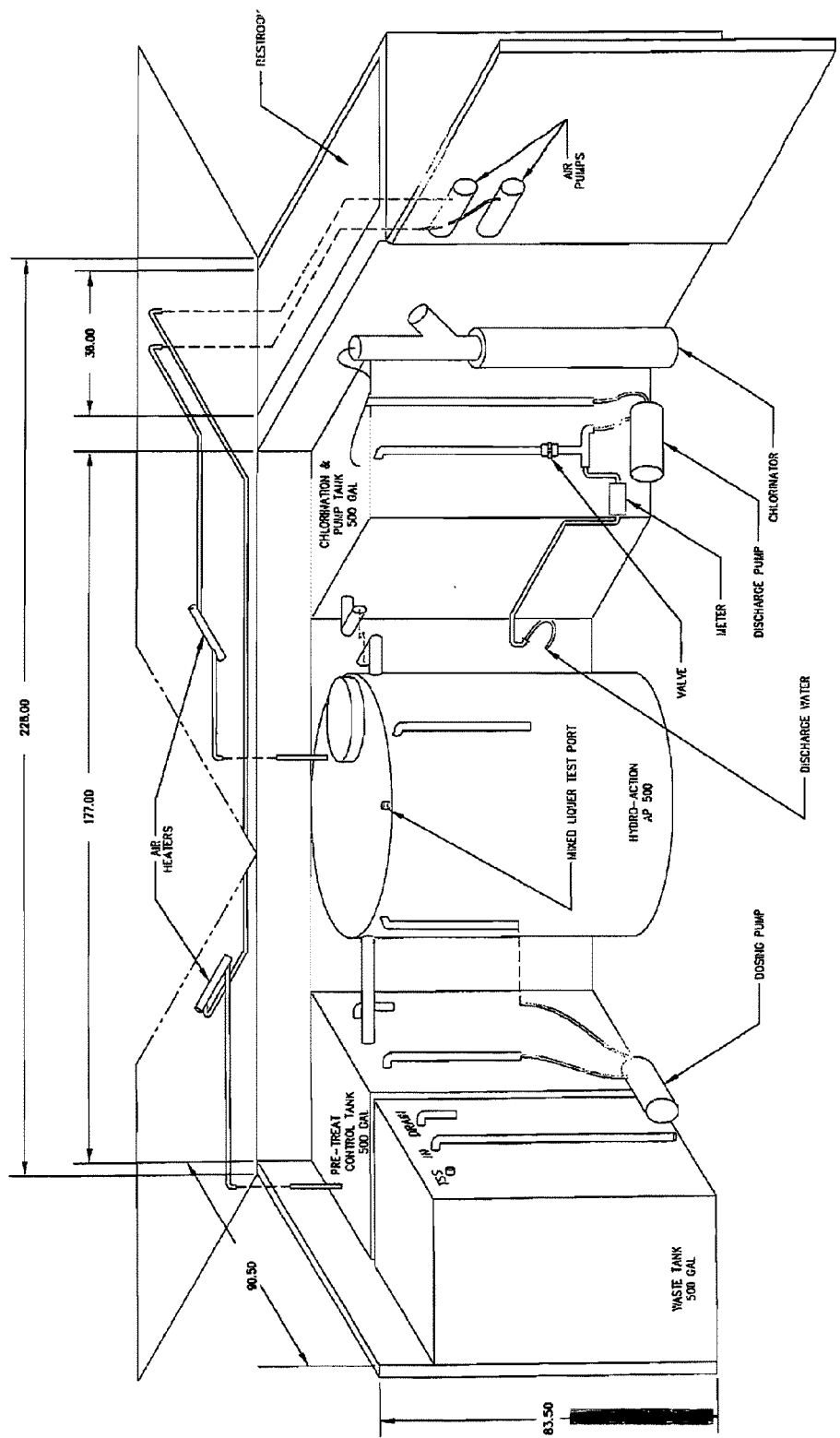
FIG. 8 shows possible dimensions of an embodiment of the portable wastewater treatment system.

Another aspect of the inventive technology may relate to a wastewater delivery system 37 configured to preclude stoppage of a main conveyance line 38 upon the stoppage of merely one of the lift stations 39 or branch lines 105 that may be feeding into that line. Indeed, such a wastewater delivery system may include a plurality of wastewater generators 40, each connected to a respective lift station 39, and all connected in parallel to a main wastewater conveyer 38 through which wastewater flows from a furthest upstream lift station 41 to a wastewater treatment system 42. Further included in the system may be a plurality of check valves 43, each check valve associated with a one of the wastewater generators 40, and each check valve established between the respective lift station 39 and the main wastewater conveyor 38. All of the lift stations may be connected to the main wastewater conveyor 38 at a junction 44 (note that the furthest upstream junction may join the most upstream lift station 41 and the second most upstream lift station 200 to the main wastewater conveyor 38). The main conveyance line is that line through which wastewater from one or more lift stations may flow. In certain embodiments, the wastewater generators 40 are mobile housing units 41 (as, e.g., may at times be found in temporary housing communities such as an oil field man camp or disaster relieve camps). The wastewater treatment system may be a portable wastewater treatment system 45, and, in certain portable system embodiments, may include at least one wastewater treatment unit (e.g., a wastewater treatment tank) established inside an ocean-going container 46. The term lift station, as is well understood, may be a collection receptacle of sorts for wastewater generated by fewer than all of the wastewater generators that are online (typically, one lift station per wastewater generator). It may include a float switch/valve 47 that enables the start of flow (e.g., gravity and/or pumped flow) when the collected wastewater reaches a certain level in the receptacle, or that enables pumping of collected wastewater when it reaches a certain level. At least conceptually, the main wastewater conveyor can be viewed as starting at the upstream-most junction The wastewater generators may all be connected in parallel, as opposed to serially, thereby precluding blockage and resultant shutdown of the entire system when merely one of the online lift stations blocks. Parallel connection is perhaps best characterized upon reference to what it is not—it is not serial connection—and to what it accomplishes. Indeed, a parallel configuration allows passage of upstream wastewater to a downstream point when an intervening lift station is blocked. The parallel configuration's benefits might be most readily appreciated upon reference to FIG. 7, which clearly shows how blockage of one lift station will not affect conveyance of wastewater generated upstream of that lift station's junction with the main conveyance line. The term junction, as used herein, refers to meeting of two or more conveyance structures (e.g., pipes) such that wastewater fluids may merge at that point. The wastewater delivery system may include a plurality of check valves, each check valve associated with a one of the wastewater generators (e.g., one check valve per wastewater generator), and each check valve established between that wastewater generator's respective lift station and the main wastewater conveyor. The check valves may act to prevent backflow of wastewater conveyed in the main conveyor (e.g., a pipe) into lift stations.

Figure 5:
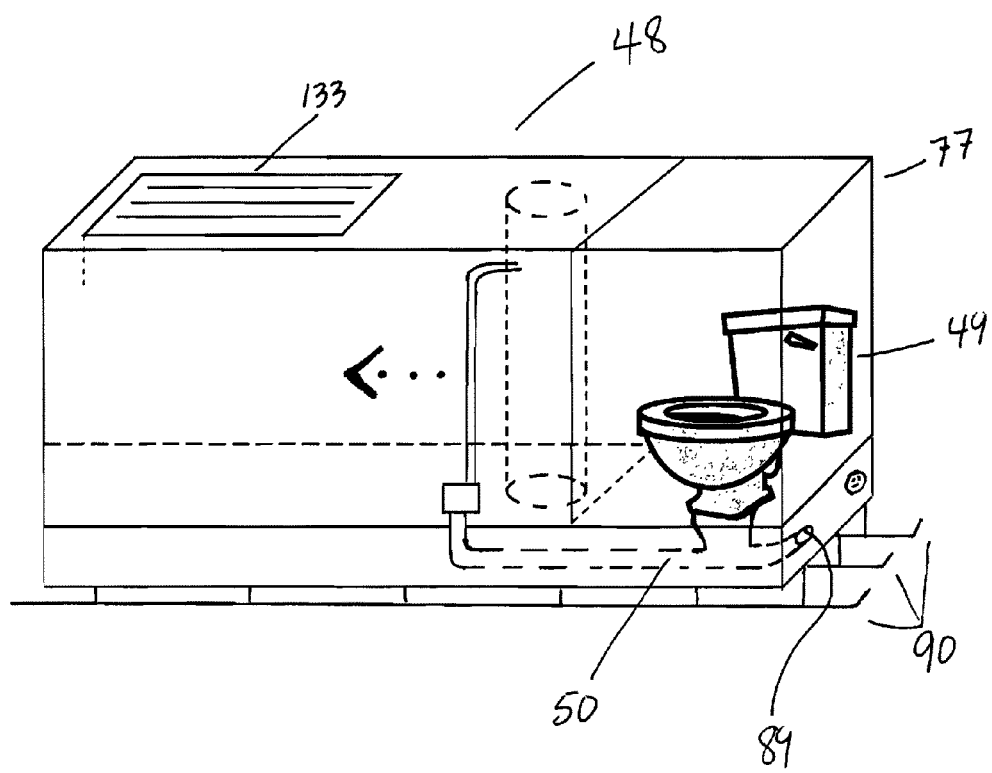
FIG. 5 shows a schematic of at least one embodiment of the inventive portable wastewater system treatment technology.
Figure 6:
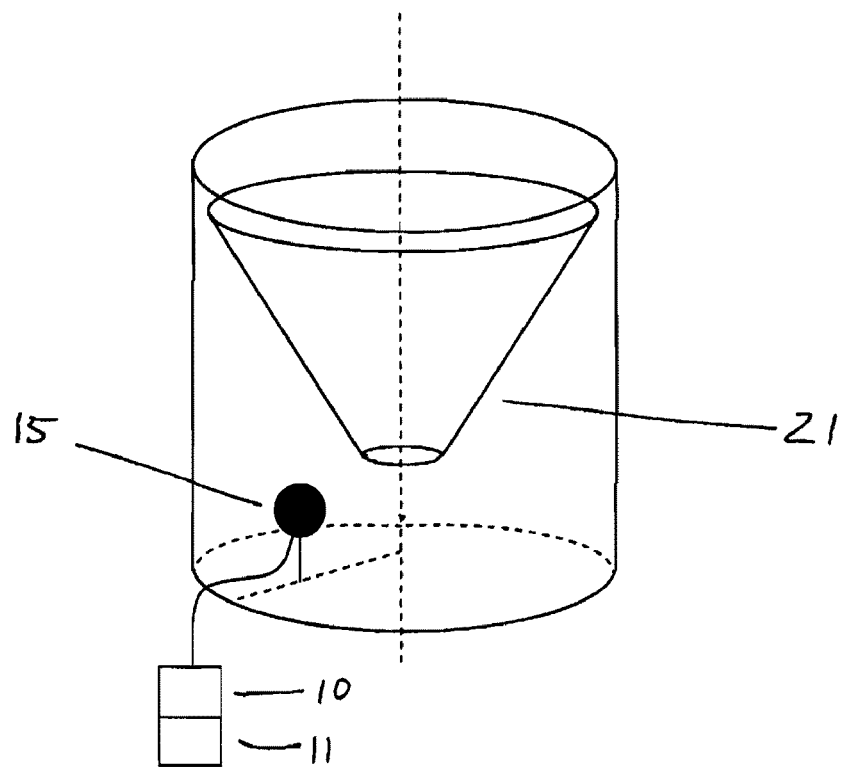
FIG. 6 shows a schematic of at least one embodiment of the inventive technology relative to establishment of the gas entrainment diaphragm.
Figure 6:
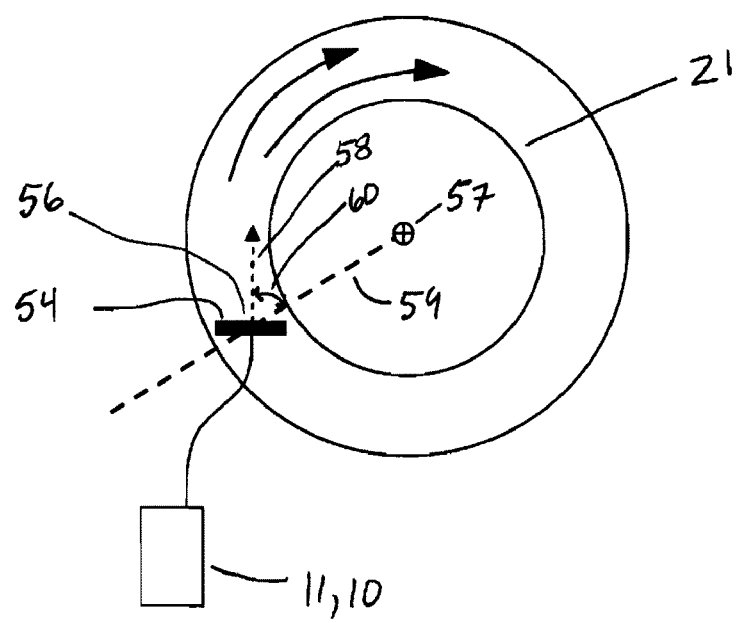

At least one embodiment of the inventive technology may relate to a portable wastewater treatment system that comprises at least one wastewater treatment tank and wastewater treatment componentry (piping, control equipment, water heater, air heater, etc.) established in a portable vessel 48 (e.g., a portable storage vessel, such as an ocean-going container), at least one wastewater generator 49 (e.g., an appliance or facility that dirties water) that generates wastewater treated by the at least one wastewater treatment tank; and a wastewater conveyor 50 that conveys wastewater from the wastewater generator to the at least one wastewater treatment tank. In some embodiments, the at least one wastewater generator (anything that dirties water, such as toilet, shower, sink and/or clothes washer, as but a few examples) is established in the portable vessel. In this way, the portable unit can be a stand-alone personal appliance facility. An exemplary treatment capacity is 500 gallons/day, but, of course, other treatment capacities may be achieved. Any embodiment, as shown in FIG. 5, may include a wastewater inlet port 89 established in the portable vessel through which wastewater from the "outside" wastewater generator may pass for treatment in the portable wastewater treatment system. In order to facilitate mobility of the portable system, there may be attached, or attachable to the vessel, skids 90, wheels, rollers, tracks, belts, and/or runners, etc. As shown, the wastewater generator (e.g., toilet) may be in a water use room, while the remainder of the vessel may be taken up by a water treatment system (including tanks, piping, pumps, etc.). Such water treatment system may be (as but a few of many possible inventive embodiments) as shown in FIGS. 1-4. Of course, such portable wastewater treatment system embodiments may offer set-up and removal benefits, in addition to drastically reducing expenditures, in those situations where temporary wastewater treatment capabilities are desired. Related methods may include a portable wastewater treatment method that includes the steps of establishing at least one wastewater treatment tank and wastewater treatment componentry in a portable vessel, and conveying wastewater from at least one wastewater generator to the at least one wastewater treatment tank with a wastewater conveyor.

Certain embodiments of the portable (or even non-portable) system may include a treated water recirculation system 51. In such embodiments, there may be at least one wastewater treatment tank such as a downstream wastewater treatment tank. Such tank, in preferred embodiments of this aspect of the inventive technology, is a furthest downstream wastewater treatment tank such as a wastewater disinfection tank. At least some embodiments of such inventive technology may include a treated water recirculation system that is configured to circulated treated water from the downstream tank to at least one wastewater generator. Of course, such a system would find particularly fitting application in those typical situations where water is scarce and/or water conservation is desired or encouraged.

At least one embodiment of the inventive technology may relate to a wastewater treatment system that comprises two serially connected aerated wastewater treatment tanks 52, 53. A related method may include the steps of serially connecting at least two wastewater treatment tanks and aerating wastewater contained in the at least two wastewater treatment tanks. Of course, the term aerated refers to the entrainment of oxygenated air into wastewater contained in the tanks. At least one embodiment of the inventive technology may relate to the establishment and use of a wastewater system with two aerated treatment tanks in a row.

At least one embodiment of the inventive technology may relate to an apparatus that comprises a wastewater treatment system that itself includes at least one wastewater treatment tank; and a port 24 established in an upper one-third of at least one of the at least one wastewater treatment tanks (e.g., an aerated wastewater treatment tank), where the port is established to allow entry of water testing equipment (e.g., water sampling equipment). A related method may comprise the steps of establishing at least one wastewater treatment tank in a wastewater treatment system; and establishing a port in an upper one-third of at least one of the at least one wastewater treatment tank such that water testing equipment can pass therethrough. Testing that is facilitated by such a port includes but is not limited to water quality testing such as testing dissolved oxygen.

An aspect of the inventive technology may focus on a gas entrainment diaphragm 15 used to entrain gas in a wastewater treatment tank. A properly selected diaphragm may generate bubbles that are smaller than those generated by conventionally used apparatus (e.g., stone diffusers). Diaphragms that may be used include, but are not limited to, certain of those available for purchase on usabluebook.com. Typically, the diaphragm used for ozone entrainment will be smaller than that used for air entrainment. In at least one embodiment, a water treatment apparatus may comprise a gas entrainment diaphragm established in the lower one-third of a wastewater treatment tank, where the gas entrainment diaphragm has a substantially planar gas ejection surface 54 characterized by a diaphragm normal vector 55 having a normal vector terminus 56 at the substantially planar gas ejection surface 54 and a linear projection therefrom, and wherein the wastewater treatment tank has a vertical centerline 57. It is noted that every tank has a vertical centerline; for those tanks having a non-circular cross-section at any height, the vertical centerline is defined as that vertical line extending vertically upwards from the centroid of the tank's base cross-sectional shape. Further, the gas entrainment diaphragm may be established in the lower one-third of the wastewater treatment tank such that the diaphragm normal vector has a horizontal component 58 that is not in alignment with a wastewater treatment tank radius 59 that emanates from the vertical centerline and passes through the normal vector terminus. The water treatment tank may comprise a wastewater clarifying structure 21 and, in preferred embodiments, the diaphragm normal vector does not intersect the water clarifier and may be substantially horizontal. Further, the horizontal component of the diaphragm normal vector may form an angle 60 of from 20 to 24 degrees (e.g., 22 degrees) with the wastewater treatment tank radius. In certain embodiments, a lower edge of the gas entrainment diaphragm is within one foot of a bottom surface of the wastewater treatment tank or perhaps, is in contact with the tank's bottom surface. It should be noted that the gas passed through the diaphragm may be oxygenated gas such as air, or ozone, as but two examples. When the diaphragm is used to generate air bubbles, an exemplary size may be nine inches (diameter); when the diaphragm is used to generate ozone bubbles, an exemplary size may be five inches.

A method related to the above-described gas entrainment apparatus may involve the steps of obtaining a gas entrainment diaphragm having a substantially planar gas ejection surface characterized by a diaphragm normal vector having a normal vector terminus at the substantially planar gas ejection surface and a linear projection therefrom, and establishing the gas entrainment diaphragm in the lower one-third of a wastewater treatment tank, wherein the wastewater treatment tank has a vertical centerline, and wherein the step of establishing the gas entrainment diaphragm in a wastewater treatment tank comprises establishing the gas entrainment diaphragm such that the diaphragm normal vector has a horizontal component that is not in alignment with a wastewater treatment tank radius that emanates from the vertical centerline and passes through the normal vector terminus. Benefits related to the use of the diaphragm include but are not limited to an increase in the oxygen available to waste processing bacteria and an increase in the ozone available to disinfect water.

It is of note that any of the inventive systems may incorporate wastewater and gas conveyance structures as necessary (e.g., piping or tubing, whether gravity flow and/or pumped), in addition to pumps (e.g., wastewater pump(s), grinder pump(s) 61, air pump(s), discharge pumps 63 that force out discharge water 99, ozone pump(s)), containers such as tanks (e.g., aeration tanks, settling tanks, clarifying tanks, discharge tanks 64, disinfection tanks 65, etc.), valves, heaters (e.g., gas heaters or water heaters), a UV unit 66 which can be used in addition to or instead of chlorine or ozone-based disinfection systems, switches (e.g., water pump float switches 62), effluent screens and filters may also form important aspects of the inventive systems. Water pump float switches (a type of sensor) may be employed at various points in the system (e.g., in a pretreatment tank) to supplement against overflow, protect heat elements against dry heating damage, provide for control over the dosing operation, in addition to assuring that tanks do not become dewatered by pumping action. Drains, that may or may not have associated piping, can enable material removal from a tank bottom and, particularly in piped systems, may extend to the outside of a tank for hookup to vacuum systems. It is noted, for purposes of clarification, that one part, structure, or device, can be properly referred with two or more names or terms. As but two examples, the discharge tank can also be a disinfection tank (e.g., chlorination using a chlorinator 131, or ozonation using an ozone source), and the main aeration tank can also be a clarifying tank.

In certain embodiments, there may be provided sensors (a broad term that includes, inter alia, float switches) and responsive alarms (beacons, horns, e.g.) indicating the need for service or maintenance of some sort. Such sensors can sense, perhaps, water level, system blockage, system overflow, low or high water or flow levels, inter alia. Such systems may be computer controlled, as indeed may any aspects of the system.

It should be understood that, once presented the inventive concepts disclosed herein, and the references incorporated herein, one of ordinary skill in the art of wastewater treatment plant design and operation would, upon reading this specification and its incorporated subject matter, and relying on their own knowledge and skill, be able to make and use the inventive subject matter. Typically all that is necessary is connecting (mechanically, with piping, e.g., or electrically, with wires) the other various components thereof. For example, certain wastewater heating technologies need only establishment of a water heater—in an appropriate position (e.g., in a pretreatment tank)—to heat water.

As can be easily understood from the foregoing, the basic concepts of the present invention may be embodied in a variety of ways. It involves both wastewater treatment techniques as well as devices to accomplish the appropriate wastewater treatment. In this application, the wastewater treatment techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims may not only be included for the device described, but also method or process claims may be included to address the functions the invention and each element performs.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms —even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "heater ", should be understood to encompass disclosure of the act of "heating "—whether explicitly discussed or not —and, conversely, were there effectively disclosure of the act of "heating ", such a disclosure should be understood to encompass disclosure of a "heater " and even a "means for heating " Such changes and alternative terms are to be understood to be explicitly included in the description.

Any acts of law, statutes, regulations, or rules mentioned in this application for patent; or patents, publications, or other references mentioned in this application for patent are hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in the list of References To Be Incorporated By Reference In Accordance With The Patent Application or other information statement filed with the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s).

Thus, the applicant(s) should be understood to have support to claim and make a statement of invention to at least: i) each of the wastewater treatment devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) the various combinations and permutations of each of the elements disclosed, and xii) each potentially dependent claim or concept as a dependency on each and every one of the independent claims or concepts presented. In addition and as to computer aspects and each aspect amenable to programming or other electronic automation, the applicant(s) should be understood to have support to claim and make a statement of invention to at least: xii) processes performed with the aid of or on a computer as described throughout the above discussion, xiv) a programmable apparatus as described throughout the above discussion, xv) a computer readable memory encoded with data to direct a computer comprising means or elements which function as described throughout the above discussion, xvi) a computer configured as herein disclosed and described, xvii) individual or combined subroutines and programs as herein disclosed and described, xviii) the related methods disclosed and described, xix)similar, equivalent, and even implicit variations of each of these systems and methods, xx) those alternative designs which accomplish each of the functions shown as are disclosed and described, xxi) those alternative designs and methods which accomplish each of the functions shown as are implicit to accomplish that which is disclosed and described, xxii) each feature, component, and step shown as separate and independent inventions, and xxiii) the various combinations and permutations of each of the above.

With regard to claims whether now or later presented for examination, it should be understood that for practical reasons and so as to avoid great expansion of the examination burden, the applicant may at any time present only initial claims or perhaps only initial claims with only initial dependencies. Support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible.

Finally, any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

What is claimed is:

1. A wastewater disinfection apparatus comprising:
a source of ozone;
an ozone pressurization system configured to pressurize said ozone; and
an ozone permeable diaphragm established in a lower one-third of a wastewater treatment tank and configured to entrain said ozone in wastewater in said wastewater treatment tank,
wherein said diaphragm has a substantially planar gas ejection surface characterized by a diaphragm normal vector having a normal vector terminus at said substantially planar gas ejection surface and a linear projection therefrom,
wherein said wastewater treatment tank has a vertical centerline,
wherein said diaphragm is established such that said diaphragm normal vector has a horizontal component that is not in alignment with a wastewater treatment tank radius that emanates from said vertical centerline and passes through said normal vector terminus, and
wherein said horizontal component of said diaphragm normal vector forms an angle of from 20 to 24 degrees with said wastewater treatment tank radius.

2. A wastewater disinfection apparatus as described in claim 1 wherein said ozone permeable diaphragm has a perforated membrane.

3. A wastewater disinfection apparatus as described in claim 1 wherein said wastewater treatment tank is a disinfection treatment tank, and further comprising a wastewater pretreatment tank established upstream of said disinfection treatment tank.

4. A wastewater disinfection apparatus as described in claim 3 further comprising a third wastewater treatment tank established downstream of said wastewater pretreatment tank and upstream of said disinfection treatment tank.

5. A wastewater disinfection apparatus as described in claim 1 wherein said source of ozone is an ozone generator.

6. A wastewater disinfection apparatus as described in claim 5 wherein said ozone generator comprises a corona discharge ozone generator.

7. A wastewater disinfection apparatus as described in claim 5 wherein said ozone generator comprises a ultraviolet light ozone generator.

8. A wastewater disinfection apparatus as described in claim 1 wherein said source of ozone is an ozone tank.

9. A wastewater disinfection apparatus as described in claim 1 further comprising an ozone conveyance system established between said ozone pressurization system and said ozone permeable diaphragm.

10. A wastewater disinfection apparatus as described in claim 1 wherein said ozone pressurization system is configured to pressurize said ozone to no greater than 8 PSI.

11. A wastewater disinfection apparatus as described in claim 10 wherein said ozone pressurization system is configured to pressurize said ozone to no greater than 4 PSI.

12. A water treatment apparatus as described in claim 1 wherein said water treatment tank comprises a wastewater clarifier and wherein said diaphragm normal vector does not intersect said water clarifier.

13. A water treatment apparatus as described in claim 12 wherein said diaphragm normal vector is substantially horizontal.

14. A water treatment apparatus as described in claim 1 wherein said horizontal component of said diaphragm normal vector forms an angle of 22 degrees with said wastewater treatment tank radius.

15. A water treatment apparatus as described in claim 1 wherein said gas entrainment diaphragm has a lower edge upon establishment in said wastewater treatment tank and wherein such lower edge is within one foot of a bottom surface of said wastewater treatment tank.

* * * * *